United States Patent
Panicker et al.

(10) Patent No.: US 8,483,338 B2
(45) Date of Patent: Jul. 9, 2013

(54) CHANNEL ESTIMATION METHOD AND SYSTEM FOR INTER-CARRIER INTERFERENCE-LIMITED WIRELESS COMMUNICATION NETWORK

(75) Inventors: John P. Panicker, Orleans (CA); Gary D. Boudreau, Kanata (CA); Neil McGowan, Stittsville (CA); Vish Nandlall, Kanata (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/587,406

(22) Filed: Aug. 16, 2012

(65) Prior Publication Data

US 2013/0022158 A1    Jan. 24, 2013

Related U.S. Application Data

(63) Continuation of application No. 12/747,407, filed as application No. PCT/CA2008/002166 on Dec. 11, 2008, now Pat. No. 8,270,547.

(30) Foreign Application Priority Data

Dec. 12, 2007    (GB) .................................. 0724208.4

(51) Int. Cl.
*H03D 1/04*    (2006.01)
(52) U.S. Cl.
USPC ........................................................ 375/346
(58) Field of Classification Search
USPC ........................................ 375/346, 296, 260
See application file for complete search history.

(56) References Cited

U.S. PATENT DOCUMENTS

| | | | |
|---|---|---|---|
| 7,453,792 B2 | 11/2008 | Chadha et al. | |
| 7,526,020 B2 | 4/2009 | Kao et al. | |
| 7,907,906 B2 | 3/2011 | Murata et al. | |
| 2004/0005010 A1* | 1/2004 | He et al. ......................... | 375/260 |
| 2004/0156309 A1* | 8/2004 | Chadha et al. ................. | 370/208 |
| 2006/0035594 A1* | 2/2006 | Murata et al. .............. | 455/67.13 |
| 2008/0008261 A1* | 1/2008 | Baggen et al. ................. | 375/296 |

FOREIGN PATENT DOCUMENTS

| | | |
|---|---|---|
| WO | 2007112489 | 10/2007 |
| WO | 2008040088 | 4/2008 |

OTHER PUBLICATIONS

International Search Report and Written Opinion dated Apr. 8, 2009 for International Application No. PCT/CA2008/002166, International Filing Date: Dec. 11, 2008, pp. 1-14.

* cited by examiner

*Primary Examiner* — Jaison Joseph
(74) *Attorney, Agent, or Firm* — Meyertons, Hood, Kivlin, Kowert & Goetzel, P.C.

(57)    ABSTRACT

A method and system for wireless communication channel estimation. A frequency offset hypothesis is determined. An interchannel interference ("ICI") matrix based on the frequency offset hypothesis is generated. Pilot channel estimates based on the ICI matrix are obtained. A correlation error of the pilot channel estimates to the frequency offset hypothesis is calculated. The correlation error is compared with a predetermined correlation error value. The frequency offset hypothesis is updated and the aforementioned steps are iteratively repeated if the correlation error is greater than the predetermined correlation error value. The pilot channel estimates are used to estimate the wireless communication channel.

20 Claims, 7 Drawing Sheets

CHANNEL ESTIMATION METHOD AND SYSTEM FOR INTER-CARRIER INTERFERENCE-LIMITED WIRELESS COMMUNICATION NETWORK

CROSS-REFERENCE TO RELATED APPLICATIONS

This application is a continuation of U.S. application Ser. No. 12/747,407, filed on Jun. 10, 2010, which is a Submission Under 35 U.S.C. §371 for U.S. National Stage patent application of International Application Number PCT/CA2008/002166, filed Dec. 11, 2008 entitled "CHANNEL ESTIMATION METHOD AND SYSTEM FOR INTER-CARRIER INTERFERENCE-LIMITED WIRELESS COMMUNICATION NETWORK", which claims priority to United Kingdom Application Serial No. 6 0724208.4, filed Dec. 12, 2007, the entirety of all which are incorporated herein by reference.

FIELD OF THE INVENTION

The present invention relates to wireless network communications and particular to a method and system for estimating the wireless channel in the presence of inter-carrier interference.

BACKGROUND OF THE INVENTION

The demand for reliable and high data throughput wireless communication networks has never been so great as in the present. While initial consumer and business demand was for wireless communication technologies to support voice communication, this demand has grown both in terms of the sheer volume of users as well as the bandwidth requirements; the latter being the result of demand for wireless broadband data services. These services are provided, for example, by Fourth Generation ("4G") wireless systems based on 3GPP Long Term Evolution ("LTE"), IEEE 802.16e WiMax, and 3GPP2 Ultra Mobile Broadband (UMB), each of which use orthogonal frequency division multiple access ("OFDMA") technology as the air interface technology. These 4G systems are mandated to support mobility of up to 350 km/hr and such systems can be deployed in various channel frequency bands up to 5 GHz.

OFDMA is a modulation and multiple wireless network access scheme in which large channel bandwidth is divided into numerous orthogonal narrowband subcarriers. Information data symbols are modulated onto these subcarriers. Because the subcarriers are narrowband, the OFDMA symbols have longer time durations. OFDMA symbols are relatively immune to multi-path and inter-symbol interferences from the radio (wireless network) channel as a result of long symbol durations.

In practical use, symbols transmitted using OFDMA propagate through a wireless fading channel which distorts the transmitted signal amplitude and distorts the phase. On the other hand, channel induced amplitude and phase needs to be estimated at the receiver in order to correctly demodulate the information symbols from the OFDMA subcarriers. Channel estimation is therefore an important aspect of receiver functionality. To aid channel estimation in OFDMA systems, some of the subcarriers in the OFDMA symbol are reserved for use as pilots. Pilot subcarriers carry symbols which are apriori known to the receiver, i.e., not user data information symbols.

OFDMA channel estimation is normally a two-step procedure. The first step is to estimate the channel for the pilot subcarriers that carry known symbols. The second step is to interpolate the channel estimate for information data bearing subcarriers using the channel estimates from pilot subcarriers. There are several known techniques for performing such interpolation, e.g., linear, second order, spline, interpolation with low pass filtering, etc.

It stands to reason that, for the interpolated channel estimates to be accurate, the estimates obtained from pilot subcarriers have to be very accurate. Therefore, the first step of extracting accurate pilot subcarrier channel estimates in presence of channel impairments and interference is an important step. A major source of interference in OFDMA systems is known as inter carrier interference ("ICI"). ICI causes subcarriers to interfere with one another resulting in degradation of the signal to noise ratio ("SNR"). ICI can occur due to the spectral broadening of the subcarriers due to Doppler offset and Doppler spread due to mobility of the receiving mobile terminals. Doppler shift/spread in the received frequency can be written as:

$$f_d = \frac{f_c v}{c} \quad (1)$$

In equation (1), $f_d$ is the Doppler shift/spread in received frequency, $f_c$ is the channel transmit/receive frequency, v is the velocity of the receive terminal, and c is the velocity of light. As the Doppler shift/spread grows to more than 1% of the subcarrier spacing, the ICI degrades the pilot SNR resulting in inaccurate pilot channel estimates and the resultant interpolated channel estimates. Unreliable channel estimation at high ICI levels causes the demodulated data error probability to increase significantly. For example, it has been found that there is approximately a 15 dB degradation in SNR at a bit error rate ("BER") of 0.01 when Doppler shift is 10% of the subcarrier spacing.

As noted above, 4G wireless communication technologies include LTE, WiMAX and UMB. The subcarrier spacings are 15 KHz, 10.94 KHz, and 9.6 KHz for LTE, WiMax and UMB respectively. For a 5 GHz channel frequency, at mobility of 350 km/hr, Doppler shifts are 10.8%, 14.81%, and 16.88% of subcarrier spacing for LTE, WiMax, and UMB based wireless systems, respectively. The result is that more than a 15 dB degradation in SNR vs. BER performance is expected at a 5 GHz channel frequency at a mobility speed of 350 km/hr when conventional channel estimation methods are employed in the receiver. In other words, ICI increases when the Doppler shill increases because the sub-carriers are spread out and begin to interfere with one another.

Channel estimation techniques try to estimate the channel so that the mean square error between the actual channel and the estimated channel is minimized. Filtering based techniques are simple to implement, but need optimization of the bandwidth of the filter which is very difficult to accomplish when the operating environment results in changing mobile terminal mobility, e.g., speed, conditions.

Minimum mean squared error ("MMSE") estimators have also been used. MMSE techniques utilize the second-order statistics of the channel conditions to minimize the mean-square error of the channel estimates. Performance using MMSE estimators is good at low mobility, but degrades at high mobility. The major drawbacks of MMSE estimators are (i) the need to know second order moments of the channel, and (ii) high computational complexity, especially if matrix inversions are needed each time the data changes. The result is that MMSE estimators are not suitable for deployment within mobile terminals.

Methods based on least squares ("LS") techniques have also been tried. LS techniques do not require any knowledge of the statistics of the channels. However, because LS estimators use calculations with very low complexity, they suffer from a high mean-square error, especially under low SNR conditions.

It is therefore desirable to have a system and method that can more accurately estimate the wireless communication channel conditions and that is deployable in a wireless mobile device. Such estimation should be suitable for deployment in wireless broadband communication systems where ICI is a factor.

SUMMARY OF THE INVENTION

The present invention advantageously provides a method and system for wireless communication channel estimation such as an OFDM wireless communication channel.

In accordance with one aspect, the present invention provides a method for wireless communication channel estimation. A frequency offset hypothesis is determined. An interchannel interference ("ICI") matrix based on the frequency offset hypothesis is generated. Pilot channel estimates based on the ICI matrix are obtained. A correlation error of the pilot channel estimates to the frequency offset hypothesis is calculated. The correlation error is compared with a predetermined correlation error value. The frequency offset hypothesis is updated and the aforementioned steps are iteratively repeated if the correlation error is greater than the predetermined correlation error value. The pilot channel estimates are used to estimate the wireless communication channel.

In accordance with another aspect, the present invention provides a system for wireless communication channel estimation from a wireless signal. An antenna receives the wireless communication signal. A receiver is in operative communication with the antenna. The receiver operates to:
 (a) determine a frequency offset hypothesis;
 (b) generate an interchannel interference ("ICI") matrix based on the frequency offset hypothesis;
 (c) obtain pilot channel estimates based on the ICI matrix;
 (d) calculate a correlation error of the pilot channel estimates to the frequency offset hypothesis;
 (e) compare the correlation error with a predetermined correlation error value;
 (f) update the frequency offset hypothesis and iteratively repeat (a)-(c) if the correlation error is greater than the predetermined correlation error value; and
 (g) use the pilot channel estimates to estimate the wireless communication channel.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As an initial matter, while certain embodiments are discussed in the context of wireless networks operating in accordance with the Ultra-Mobile Broadband ("UMB") broadband wireless standard, which is hereby incorporated by reference, the invention is not limited in this regard and may be applicable to other broadband networks including those operating in accordance with other OFDM orthogonal frequency division ("OFDM")-based systems including other WiMAX (IEEE 802.16) and 3rd Generation Partnership Project ("3GPP") evolution, e.g., Long Term Evolution ("LTE"), etc. Similarly, the present invention is not limited solely to OFDM-based systems and can be implemented in accordance with other system technologies, e.g., CDMA, single carrier-frequency division multiple access ("SC-FDMA"), etc.

Figure 1:
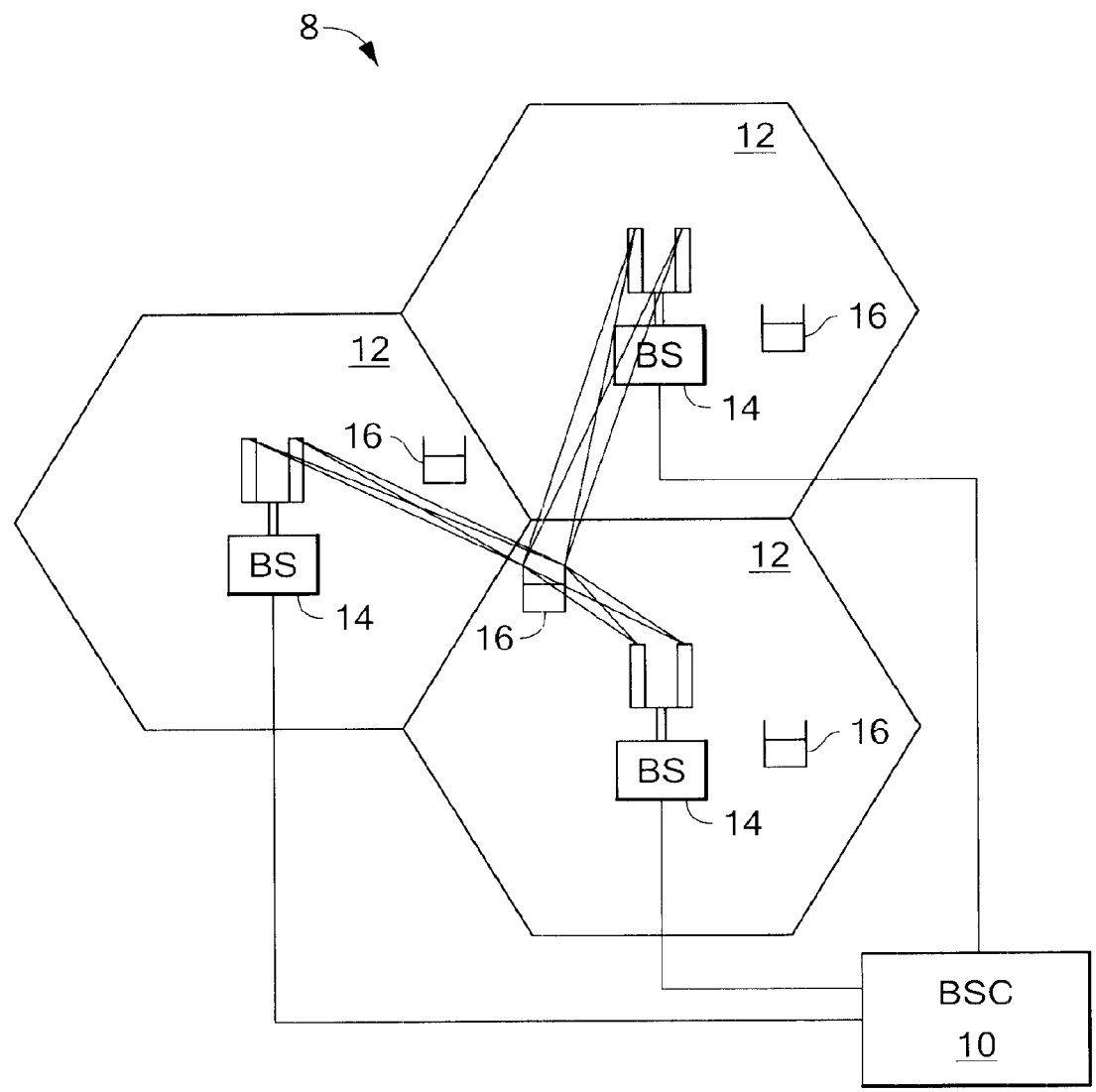
FIG. 1 is a diagram of an embodiment of a system constructed in accordance with the principles of the present invention.

Referring now to the drawing figures in which like reference designators refer to like elements, there is shown in FIG. 1, a system constructed in accordance with the principles of the present invention and designated generally as "8." System 8 includes a base station controller ("BSC") 10 that controls wireless communications within multiple cells 12, which are served by corresponding base stations ("BS") 14. Although not shown, it is understood that some implementations, such LTE and WiMax, do not make use of BSC 10. In general, each base station 14 facilitates communications using OFDM with mobile terminals 16, which are illustrated as being within the geographic confines of the cell 12 associated with the corresponding base station 14. Movement of mobile terminals 16 in relation to the base stations 14 can result in significant fluctuation in channel conditions as a consequence of multipath distortion, terrain variation, reflection and/or interference caused by man-made objects (such as buildings and other structures), and so on. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 2:
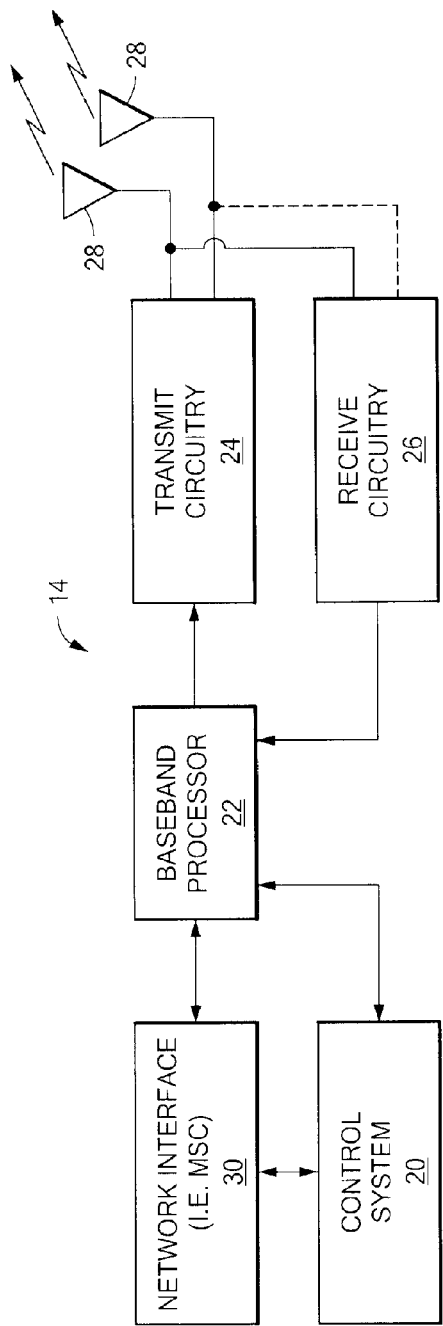
FIG. 2 is a block diagram of an exemplary base station constructed in accordance with the principles of the present invention.

A high level overview of the mobile terminals 16 and base stations 14 of the present invention is provided prior to delving into the structural and functional details of the preferred embodiments. With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3). Preferably, a low noise amplifier and a filter (not shown) cooperate to amplify and remove out-of-band interference from the signal for processing. Down conversion and digitization circuitry (not shown) then down converts the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors ("DSPs") or application-specific integrated circuits ("ASICs"). The received information is then sent across a wireline or wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) amplifies the modulated carrier signal to a level appropriate for transmission, and delivers the modulated carrier signal to the antennas 28 through a matching network (not shown). Modulation and processing details are described in greater detail below.

Figure 3:
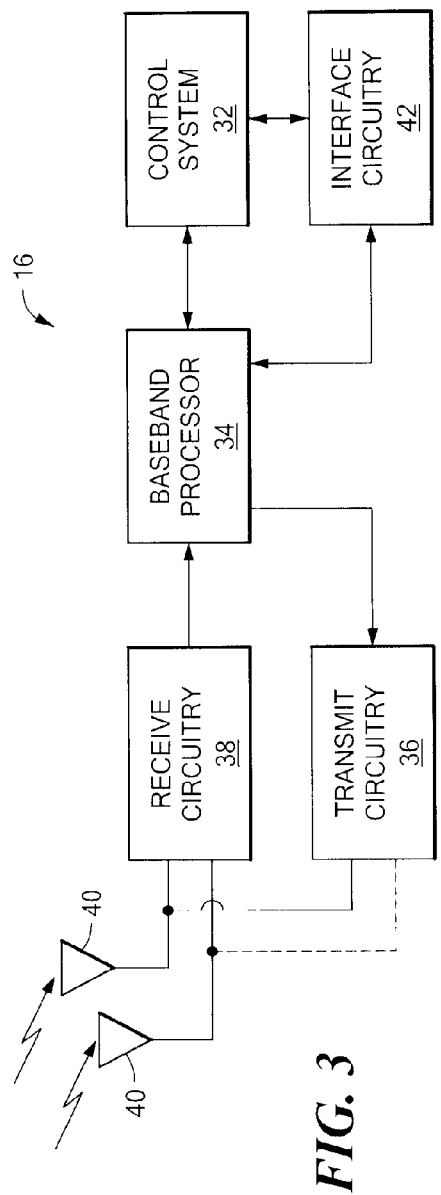
FIG. 3 is a block diagram of an exemplary mobile terminal constructed in accordance with the principles of the present invention.

With reference to FIG. 3, a mobile terminal 16 configured according to one embodiment of the present invention is described. Similar to base station 14, a mobile terminal 16 constructed in accordance with the principles of the present invention includes a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove out-of-band interference from the signal for processing. Down conversion and digitization circuitry (not shown) then down convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors ("DSPs") and application specific integrated circuits ("ASICs").

With respect to transmission, the baseband processor 34 receives digitized data, which may represent voice, data, or control information, from the control system 32, which the baseband processor 34 encodes for transmission. The encoded data is output to the transmit circuitry 36, where it is used by a modulator to modulate a carrier signal that is at a desired transmit frequency or frequencies. A power amplifier (not shown) amplifies the modulated carrier signal to a level appropriate for transmission, and delivers the modulated carrier signal to the antennas 40 through a matching, network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation is implemented, for example, through the performance of an Inverse Fast Fourier Transform ("IFFT") on the information to be transmitted. For demodulation, a Fast Fourier Transform ("FFT") on the received signal is performed to recover the transmitted information. In practice, the IFFT and FFT are provided by digital signal processing carrying out an Inverse Discrete Fourier Transform (IDFT) and Discrete Fourier Transform ("DFT"), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is used for at least the downlink transmission from the base stations 14 to the mobile terminals 16. Each base station 14 is equipped with n transmit antennas 28, and each mobile terminal 16 is equipped with in receive antennas 40. Notably, the respective antennas can be used for reception and transmission using appropriate duplexers or switches and are so labeled only for clarity.

Figure 4:
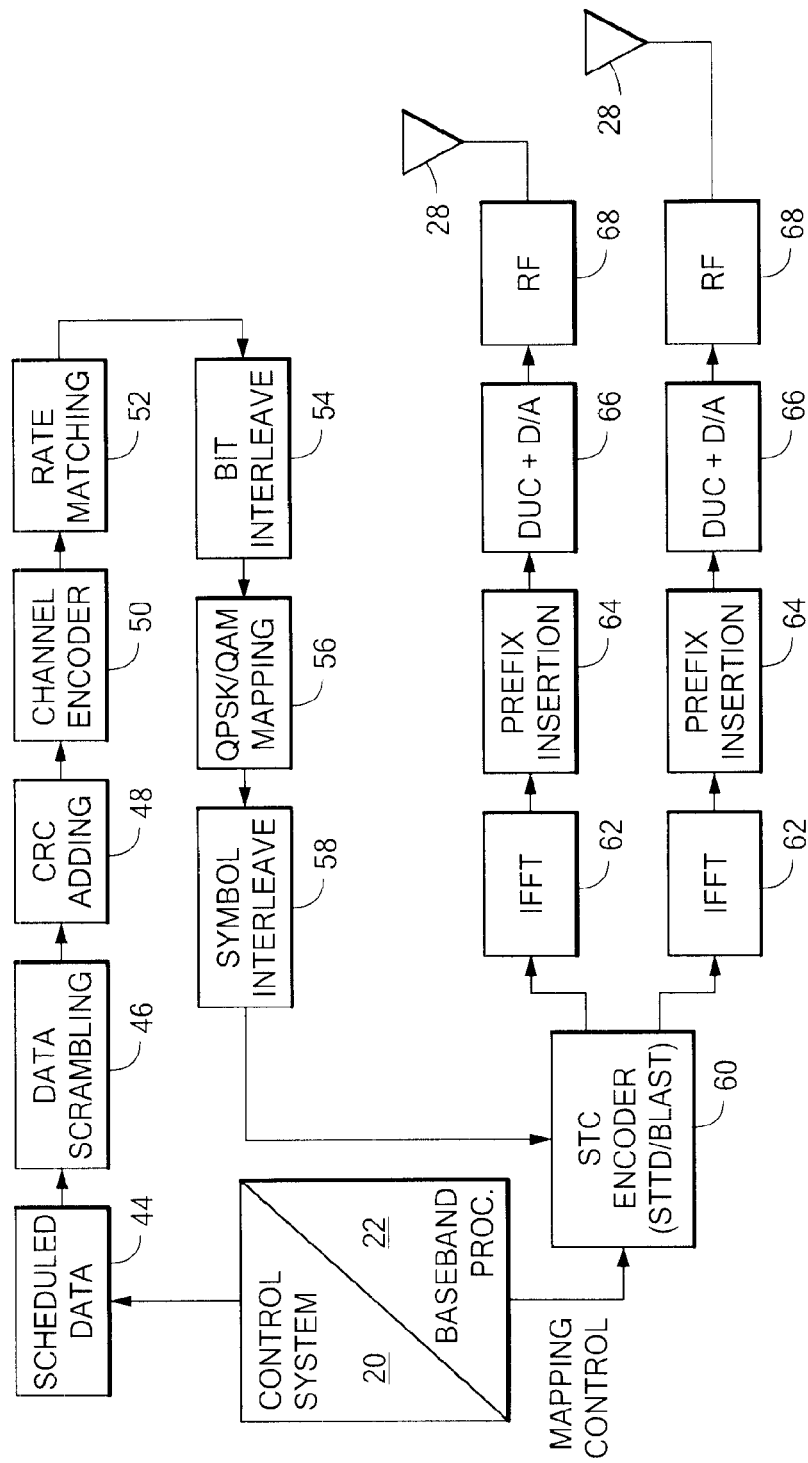
FIG. 4 is a block diagram of an exemplary OFDM architecture constructed in accordance with the principles of the present invention.

With reference to FIG. 4, a logical OFDM transmission architecture is described according to one embodiment. Initially, the base station controller 10 sends data to be transmitted to various mobile terminals 16 to the base station 14. The base station 14 may use the channel quality indicators ("CQIs") associated with the mobile terminals to schedule the data for transmission as well as select appropriate coding and modulation for transmitting the scheduled data. The CQIs may be provided directly by the mobile terminals 16 or determined at the base station 14 based on information provided by the mobile terminals 16. In either case, the CQI for each mobile terminal 16 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check ("CRC") for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation ("QAM") or Quadrature Phase Shift Key ("QPSK") modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-tune block code ("STC") encoder logic 60, which modifies the symbols in a fashion making the transmitted signals more resistant to interference and more readily decoded at a mobile terminal 16. The STC encoder logic 60 will process the incoming symbols and provide n outputs corresponding to the number of transmit antennas 28 for the base station 14. The control system 20 and/or baseband processor 22 will provide a mapping control signal to control STC encoding. At this point, assume the symbols for the n outputs are representative of the data to be transmitted and capable of being recovered by the mobile terminal 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RE frequency, amplified, and transmitted via the RE circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 5:
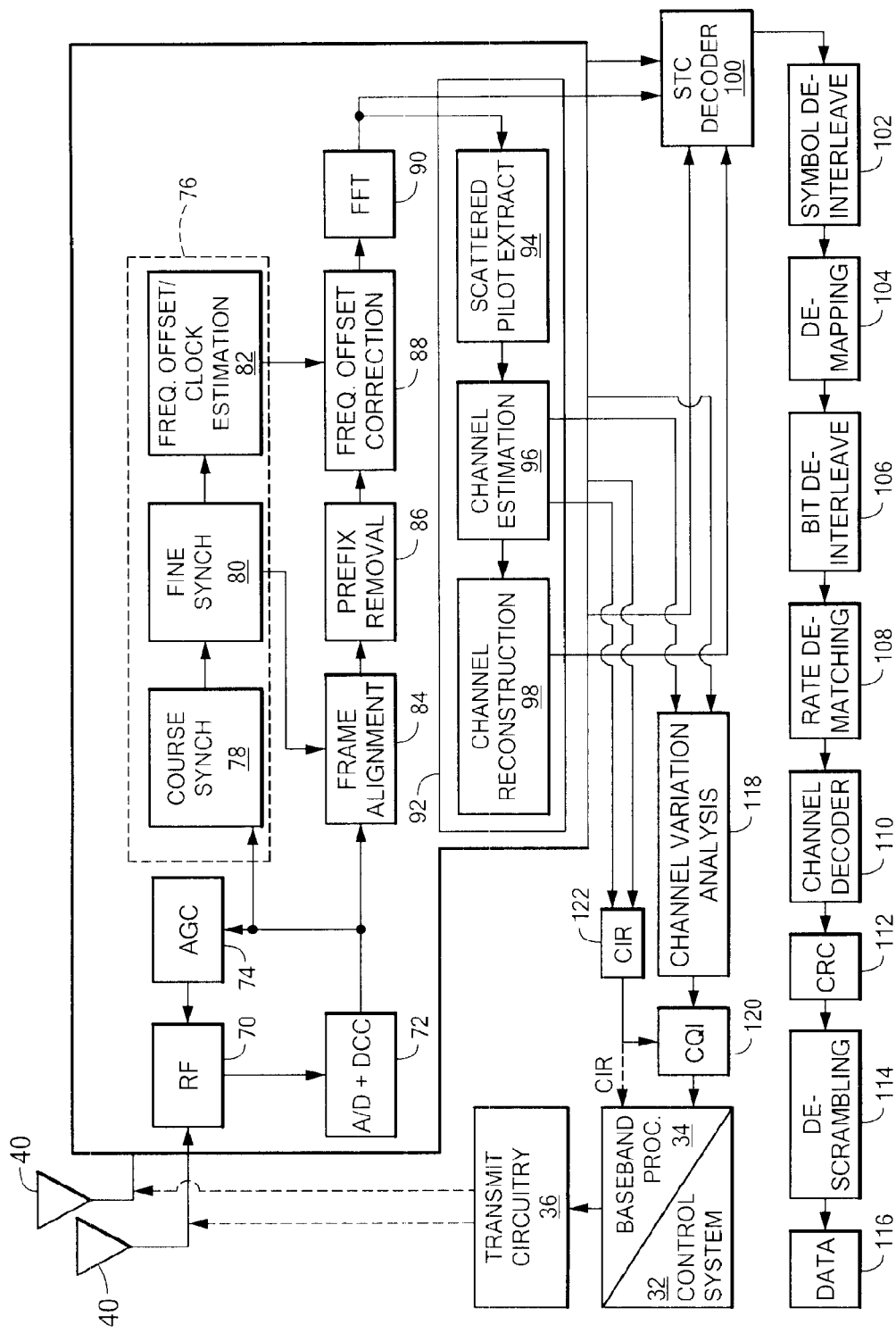
FIG. 5 is a block diagram of the flow of received signal processing in accordance with the principles of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the receive paths is described and illustrated in detail, it being understood that a receive path exists for each antenna 40. Analog-to-digital ("A/D") converter and down-conversion circuitry 72 digitizes and downconverts the analog signal for digital processing. The resultant digitized signal may be used by automatic gain control circuitry ("AGC") 74 to control the gain of the amplifiers in the RE circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a line synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 6:
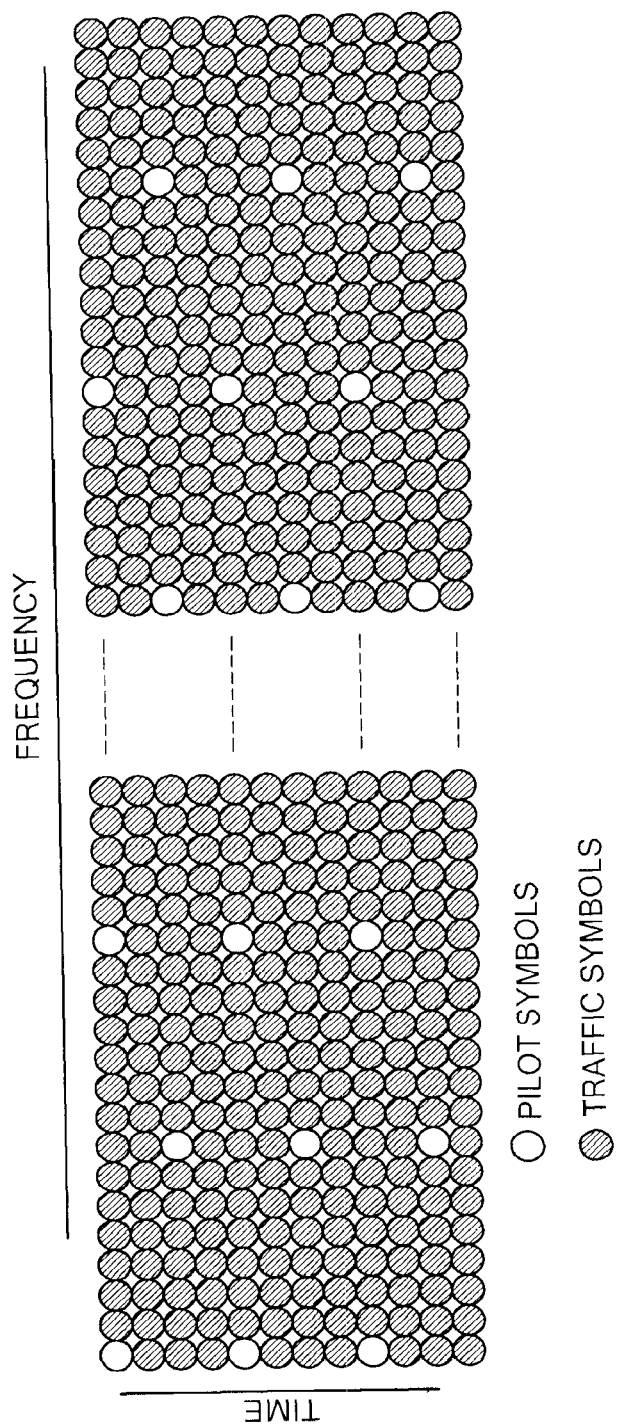
FIG. 6 is a diagram of an exemplary scattering of pilot symbols among available sub-carriers.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 6 illustrates an exemplary scattering of pilot symbols among available sub-carriers over a given time and frequency plot in an OFDM environment. Referring again to FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel. An exemplary system and method for providing this estimation, even in the face of ICI, are discussed below in detail.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

The present invention advantageously provides a method and system for pilot channel estimation in the face of ICI. Accurate pilot channel estimation at high ICI is achieved through an iterative joint search of frequency offset and channel. The estimated frequency offset obtained through this iterative search procedure is passed on to the receiver 38 front end frequency tracking and compensation circuit, e.g., synchronization circuit 76. The estimated channel information is passed on to interpolate the data channel estimates. The joint search for frequency offset and channel is performed on each OFDMA symbol. Frequency offset estimates from the previous search are used to reduce the number of search iterations for the following OFDMA symbols.

The present invention is described using the following components for ICI-limited OFDMA channel estimation:

Modeling of the ICI in the OFDM symbol;

Properties of the ICI model of the present invention to reduce the computational and hence processing burden of the iterative search procedure;

Method for joint estimation of the frequency offset and the channel;

LMS search technique for the frequency offset and the channel; and

Exemplary process for implementing the present invention.

Each is described in detail.

Modeling of ICI in the OFDM Symbol

OFDMA transmitter 24 converts a serial data stream into parallel blocks of size N and modulates these blocks using an Inverse Discrete Fourier Transform ("IDFT") to create an OFDMA symbol. Time domain samples can be represented as $$x(n) = IDFT\{X_k\} = \sum_{k=0}^{N-1} X_k e^{j2\pi nk/N}; 0 \le n \le N-1 \quad (2)$$

Where, in equation (2), $X_k$ is the symbol transmitted on the k th subcarrier. The time domain signal is cyclically extended to avoid ISI from previous symbol.

Some of the transmitted OFDMA symbols, known as preambles, carry pilot symbols in all the N subcarriers. Other OFDMA symbols may carry pilot symbols and data symbols within their N subcarriers. At receiver 38, the signal is received along with noise. Receiver 38 front end performs coarse channel frequency tracking and frequency compensation using, for example, synchronization circuitry 78. This is followed by time synchronization and removal of the cyclic prefix using prefix remover 86. Receiver 38 then performs an FFT on the received time domain samples. The baseband received frequency domain samples can be written in matrix form using equation 3 below as:

$$y = S_{\epsilon p} X h + n \quad (3)$$

where y is the vector of received symbols, and X is a diagonal matrix with the transmitted pilot symbols on its diagonal. The vector $h = [h_1 h_2 \ldots h_N]^T$ represents the channel induced amplitude and phase. The goal of the channel estimation is the estimation of the vector h which is also referred to as the channel frequency response (CFR) vector. n is the additive white Gaussian noise vector with mean zero and variance of $\sigma_n^2$.

The N×N matrix, $S_{\epsilon p}$, is the ICI matrix. This ICI matrix represents the leakage among subcarriers, i.e., crosstalk, due to the received frequency offset coming from oscillator drift or Doppler spread/Doppler shift resulting from mobility in the wireless channel. If there is no frequency offset. i.e. $\epsilon p=0$, then $S_{\epsilon p}$ becomes $S_0=I$ (identity matrix), which implies no interference among neighboring subcarriers. The entries of $S_{\epsilon p}$ can be found using the following formula:

$$S_{\epsilon_p}(m, n) = \frac{\sin\pi(m - n + \epsilon_p)}{N\sin\frac{\pi}{N}(m - n + \epsilon_p)} e^{j\pi(m-n+\epsilon_p)} \quad (4)$$

Where, in formula (4), $\epsilon_p$ is the normalized carrier frequency offset, i.e., the ratio of the frequency offset to the inter-subcarrier spacing.

Properties of the ICI Model of the Present Invention to Reduce Computational Burden of Iterative Search Procedure There are some properties of the interference matrix that can be used to reduce the computational burden of the estimation method of the present invention. These properties are described as follows:

Property 1: $S^H S = I$. The interference matrix is a unitary matrix ("I" refers to the identity matrix). Therefore, the inverse of the interference matrix can be calculated easily by taking the conjugate transpose since $S^{-1} = S^H$, where H is the conjugate transpose.

Property II: $S_{\epsilon 1} S_{\epsilon 2} = S_{\epsilon 1 + \epsilon 2}$. If two interference matrices corresponding to two different frequency offsets are multiplied, another interference matrix corresponding to the sum can be obtained. This enables simple and processing non-intensive generation of several ICI matrices for the frequency offset/channel search procedure from a few stored ICI matrices.

Property III: $S_{-\epsilon} = S_{\epsilon}^H$. The interference matrix for a negative frequency offset can be obtained from the interference matrix corresponding to a positive frequency offset with the same magnitude by finding the complex transpose.

With these properties in mind, an exemplary method for jointly estimating the frequency offset and channel is described.

Method of Joint Estimation of Frequency Offset and Channel

In the case where the interference matrix $S_{\epsilon p}$, in equation (3) is known at the receiver, pre-multiplying the received vector y with the conjugate transpose of that matrix will completely eliminate the ICI in the received OFDM signal, and accurate estimation of the channel frequency response ("CFR") vector can be obtained. However, the interference matrix $S_{\epsilon p}$ is not generally known to receiver 38 because as it depends on the unknown carrier frequency offset, $\epsilon_p$ resulting from the mobility in the wireless channel.

The present invention seeks to match the actual frequency offset $\epsilon_p$ with $\epsilon_h$, where $\epsilon_h$ is a hypothetical value for the true frequency offset. Using this hypothetical value, the ICI matrix $S\epsilon_h$ is computed. Because pilot symbols are already known at the receiver, $(S_{\epsilon h} X)^{-1}$ can be generated. The pilot channel estimate $h\epsilon_h$ corresponding to the frequency offset hypothesis $\epsilon_h$ is obtained by multiplying both sides of equation (3) with $(S_{\epsilon h} X)^{-1}$.

$$(S_{\epsilon h} X)^{-1} y = (S_{\epsilon h} X)^{-1} S_{\epsilon p} X h + (S_{\epsilon h} X)^{-1} n \, h_{\epsilon h} = X^{-1} S_{\epsilon h}^{-1} S_{\epsilon p} X h + n_{\epsilon h} \quad (5)$$

By making use of Properties I-III of the interference matrix described above, the multiplication of two interference matrices in equation (5) above can be written as $$S_{\epsilon h}^{-1} S_{\epsilon p} = S_{\epsilon h} S_{\epsilon p} = S_{\epsilon p - \epsilon h} = S_{\epsilon r} \quad (6)$$

where $\epsilon_r$ is the difference between the actual frequency offset and frequency offset hypothesis, i.e. the residual frequency offset or the error in the frequency offset hypothesis.

By way of further simplification, equation (5) may therefore be written as:

$$h_{\epsilon h} = X^{-1} S_{\epsilon r} X h + n_{\epsilon h} \quad (7)$$

Equation (7) will yield several channel estimates for different frequency offset hypotheses. For the frequency offset hypothesis, $\epsilon_h$, which is closest to the actual frequency offset, $\epsilon_p$, equation (7) will yield the best estimate of the CFR.

For choosing the best frequency offset hypothesis, correlation of the pilot channel estimates vector is used as the decision criteria. Correlation approaches the maximum value when the frequency offset hypothesis, $\epsilon_h$, approaches the actual frequency offset $\epsilon_p$. Correlation of the pilot channel estimates vector, $h_{\epsilon h}$, is performed for each iteration of the frequency offset hypotheses. Correlation of the pilot channel estimates vector, $h_{\epsilon h}$, depends on the residual frequency offset.

LMS Search Technique for Frequency Offset and Channel

A search method and corresponding criterion are used to achieve convergence of the frequency offset hypothesis. The frequency offset search method of the present invention is based on either an optimal gradient search or a pragmatic implementation based on an adaptive Least Mean Square ("LMS") technique. LMS techniques in generally are known and not described herein. The search criterion is a maximization of the pilot channel frequency correlation. The LMS method of the present invention is a gradient-based method of steepest decent to achieve convergence in the frequency offset hypothesis. The LMS method of the present invention incorporates an iterative procedure that makes successive corrections to the frequency offset hypothesis in the direction of the negative of the gradient vector. This eventually leads to the minimum mean square error of the estimate.

An exemplary LMS method for frequency offset and channel estimation is described with reference to the flow chart of FIG. 7 and the process block diagram of FIG. 8. In general, the frequency offset hypothesis for the (n+1) th iteration of the search loop, during a given OFDM symbol duration. is derived using equation (8) follows:

Error! Objects cannot be created from editing field codes. where Error! Objects cannot be created from editing field codes. is the frequency offset hypothesis for the (n−1) th iteration of the LMS search, Error! Objects cannot be created from editing field codes. is the frequency offset hypothesis used in the previous (n)th iteration of the LMS search, Error! Objects cannot be created from editing field codes. is the gradient parameter and Error! Objects cannot be created from editing field codes. is the frequency correlation error. The latter portion of equation (8), namely Error! Objects cannot be created from editing field codes. Error! Objects cannot be created from editing field codes. Error! Objects cannot be created from editing field codes. is the component (also referred to herein as $\Delta\epsilon_h$) that is updated with each iteration.

Figure 7:
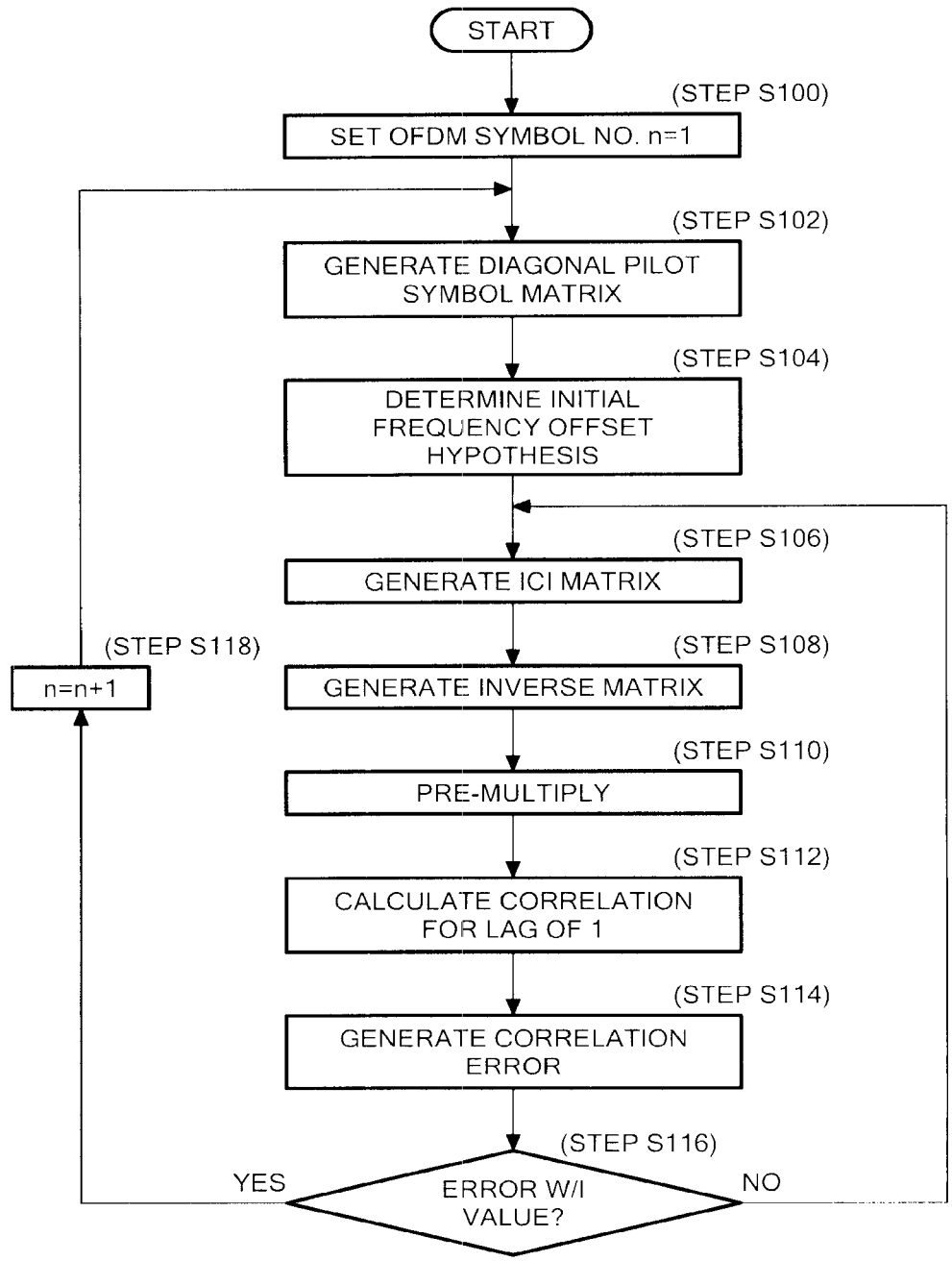
FIG. 7 is a flow chart of a least mean square channel estimation method in accordance with the principles of the present invention.
Figure 8:
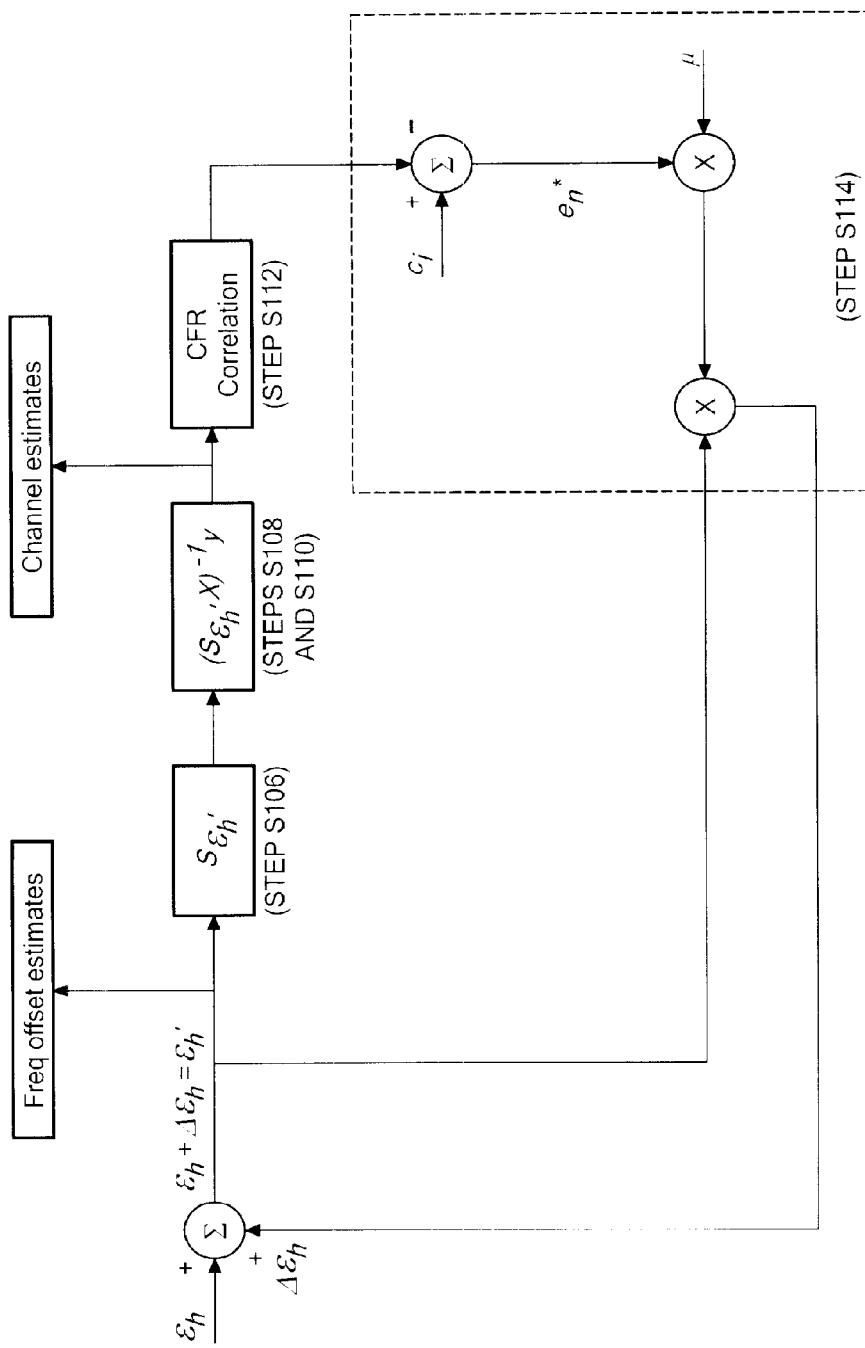
FIG. 8 is a block diagram of the least mean square estimation method of FIG. 7.

Referring to FIG. 7, OFDM symbol number is set to n=1 (step S100). For the nth received baseband OFDM symbol, a diagonal pilot symbol matrix X is generated (step S102). An initial frequency offset hypothesis $\epsilon_{h,n}(0)$ value for the LMS search is determined (step S104). This value can be obtained from (n−1)th OFDMA symbol frequency offset search if n #1.

If n=1, then this value is obtained from the coarse frequency tracking loop. The ICI matrix, $S_{\epsilon h,n(0)}$, corresponding to this frequency offset is generated using equation (4) above (step S106). The inverse matrix $(S_{\epsilon h,n(0)} X)^{-1}$ is generated (step S108). The received baseband vectory is pre-multiplied with $(S_{\epsilon h,n(0)} X)^{-1}$ (step S110). For the pilot channel estimates vector obtained from step S110, the correlation for correlation lag of 1 is determined (step S112). The correlation error is generated as Ci− value from step S112 and the frequency offset hypothesis $S_{\epsilon h,n(1)}$ is then updated for the next iteration using correlation error (step S114). Steps S106 to S114 are repeated with $S_{\epsilon h,n(1)} \ldots S_{\epsilon h,n(m)}$ where m is the number of iterations, until the correlation error is within a predetermined value (step S116). The predetermined value is established based on the designer's preference. The lower the correlation error (and higher the correlation), the greater the system performance due to better estimation. However, the processing result is that it will take more iterations to achieve the higher correlation.

The OFDM symbol number n is set to n=n+1 and steps S104 to S116 are repeated (step S118). Of note, if a symbol has no pilot, estimation using that symbol is skipped. The best frequency offset value is used for the next OFDM symbol search and is passed to the receiver front end frequency offset correction 88. In addition, the best pilot channel estimate values obtained is passed on for data channel interpolation. FIG. 8 shows the process is a block diagram form and shows a mapping of the above-referenced steps into the overall process of the present invention.

The system and method of the present invention can improve link level performance of uncoded OFDM systems by up to 15 dB. Actual performance improvements that can be realized from the invention depend on certain factors of the wireless channel and the parameters of the frequency offset search loop. These factors include but are not limited to channel frequency and mobile device mobility, the type of modulation used (QPSK/QAM) in the OFDM system, the optimization of the frequency offset search loop parameters ($C_i$ and $\mu$), the number of iterations in the frequency offset search and the type of interpolation used for data channel estimates from pilot channel estimates. The data channel estimate is used by the receiver, for example, to establish a CQI which in turn is used to select a modulation and coding scheme.

Although the present invention is described with respect to receiver 38 in mobile device 16, the present invention is not limited in this matter. It is readily apparent and contemplated that the present invention can be implanted in the receiver of base station 14.

The present invention advantageously provides a method and system that can be used to estimate an OFDMA wireless communication channel in a manner that is accurate without burdening the processor of mobile devices 16 and base stations 14 in system 8. The method allows an acceptable correlation error to be specified such that a larger acceptable error requires fewer iterations from the initial (and updated) frequency hypothesis.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

The invention claimed is:

1. A mobile handset configured to perform wireless communication channel estimation, comprising:
   one or more antennas configured to receive wireless communication signals over one or more wireless communication channels; and
   processing hardware coupled to the one or more antennas, wherein the processing hardware is configured to:
   (a) store a frequency offset hypothesis and an interchannel interference ("ICI") matrix;
   (b) determine pilot channel estimates based on the ICI matrix;
   (c) calculate a correlation error of the pilot channel estimates to the frequency offset hypothesis;
   (d) compare the correlation error with a predetermined correlation error value;
   (e) update the frequency offset hypothesis and repeat steps (a)-(e) if the correlation error is greater than the predetermined correlation error value; and
   (f) use the pilot channel estimates to estimate a wireless communication channel of the one or more wireless communication channels.

2. The mobile handset of claim 1, wherein the wireless communication channel is an OFDM channel.

3. The mobile handset of claim 2, wherein steps (a)-(f) are performed for each OFDM symbol having a pilot.

4. The mobile handset of claim 1, wherein the correlation is based on a correlation lag of 1.

5. The mobile handset of claim 1, wherein said determining pilot channel estimates based on the ICI matrix comprises:
   generating an inverse matrix of the product of the ICI matrix and a pilot symbol diagonal matrix; and
   pre-multiplying a received baseband vector with the inverse matrix.

6. The mobile handset of claim 1, wherein said updating the frequency hypothesis is based on a least mean squared method seeking to maximize pilot channel frequency correlation.

7. The mobile handset of claim 1, wherein said updating the frequency offset hypothesis comprises adding an updated frequency offset component to the frequency offset hypothesis.

8. The mobile handset of claim 7, wherein the updated frequency offset component includes a gradient parameter and a frequency correlation error component.

9. The mobile handset of claim 1, wherein the ICI matrix corresponds to leakage among subcarriers in the wireless communication channel.

10. The mobile handset of claim 1, wherein the processing hardware is further configured to:
    establish a channel quality indicator ("CQI") based on the estimate of the wireless communication channel; and
    select a modulation and coding scheme based on the CQI.

11. A method for performing wireless communication channel estimation, comprising:
    (a) storing a frequency offset hypothesis and an interchannel interference ("ICI") matrix;
    (b) determining pilot channel estimates based on the ICI matrix;
    (c) calculating a correlation error of the pilot channel estimates to the frequency offset hypothesis;
    (d) comparing the correlation error with a predetermined correlation error value;
    (e) updating the frequency offset hypothesis and repeat steps (a)-(e) if the correlation error is greater than the predetermined correlation error value; and
    (f) using the pilot channel estimates to estimate a wireless communication channel.

12. The method of claim 11, wherein the wireless communication channel is an OFDM channel.

13. The method of claim 12, wherein steps (a)-(f) are performed for each OFDM symbol having a pilot.

14. The method of claim 11, wherein the correlation is based on a correlation lag of 1.

15. The method of claim 11, wherein said determining pilot channel estimates based on the ICI matrix comprises:
    generating an inverse matrix of the product of the ICI matrix and a pilot symbol diagonal matrix; and
    pre-multiplying a received baseband vector with the inverse matrix.

16. The method of claim 11, wherein said updating the frequency hypothesis is based on a least mean squared method seeking to maximize pilot channel frequency correlation.

17. The method of claim 11, wherein said updating the frequency offset hypothesis comprises adding an updated frequency offset component to the frequency offset hypothesis.

18. The method of claim 17, wherein the updated frequency offset component includes a gradient parameter and a frequency correlation error component.

19. The method of claim 11, wherein the ICI matrix corresponds to leakage among subcarriers in the wireless communication channel.

20. The method of claim 11, further comprising:
    establishing a channel quality indicator ("CQI") based on the estimate of the wireless communication channel; and
    selecting a modulation and coding scheme based on the CQI.

* * * * *